(12) United States Patent
Desbruslais et al.

(10) Patent No.: US 7,684,711 B2
(45) Date of Patent: Mar. 23, 2010

(54) PULSED HIGH LOSS LOOP BACK SIGNALLING SCHEME

(75) Inventors: Steve Desbruslais, London (GB); John Ellison, Essex (GB); David Powell, Kent (GB)

(73) Assignee: Xtera Communications, Inc., Allen, TX (US)

( * ) Notice: Subject to any disclaimer, the term of this patent is extended or adjusted under 35 U.S.C. 154(b) by 632 days.

(21) Appl. No.: 11/568,185

(22) PCT Filed: Apr. 21, 2005

(86) PCT No.: PCT/GB2005/001508

§ 371 (c)(1),
(2), (4) Date: Dec. 30, 2006

(87) PCT Pub. No.: WO2005/104406

PCT Pub. Date: Nov. 3, 2005

(65) Prior Publication Data

US 2009/0154919 A1 Jun. 18, 2009

(30) Foreign Application Priority Data

Apr. 22, 2004 (GB) ................................. 0409005.6

(51) Int. Cl.
*H04B 10/02* (2006.01)
(52) U.S. Cl. .................... 398/181; 398/33; 398/177; 398/135; 398/136; 398/11
(58) Field of Classification Search ................ 398/173, 398/174, 175, 176, 177, 180, 181, 33, 30, 398/31, 11, 18, 135, 136, 128, 130, 158, 398/159, 160, 162, 163, 164
See application file for complete search history.

(56) References Cited

U.S. PATENT DOCUMENTS

| 5,510,925 | A | | 4/1996 | Suzuki et al. |
| 5,825,515 | A | * | 10/1998 | Anderson ................. 398/10 |
| 6,708,004 | B1 | * | 3/2004 | Homsey ................. 398/177 |
| 2004/0047629 | A1 | | 3/2004 | Evangelides et al. |

FOREIGN PATENT DOCUMENTS

| EP | 0 883 254 A | 12/1998 |
| GB | 2 294 373 A | 4/1996 |

* cited by examiner

*Primary Examiner*—Hanh Phan
(74) *Attorney, Agent, or Firm*—Workman Nydegger

(57) ABSTRACT

An optical transmission system comprises two optical fibers carrying optical signal traffic between two terminals, and a plurality of optical repeaters coupled to the two fibers each repeater having a permanently connected passive high loss loop back circuit between the two fibers. One terminal includes a transmitter, which launches a pulsed supervisory signal on a dedicated supervisory wavelength into one optical fiber, and a receiver, which detects a portion of the supervisory signal looped back from each repeater in order to identify the existence and location of faults in the transmission system. The pulsed supervisory signal is of sufficiently short duration such that portions of the signal returned from each repeater do not overlap with one another and interference with the counter-propagating traffic is avoided by utilizing a dedicated supervisory wavelength. Each return pulse is integrated sequentially by a single detector and processed by heterodyne reception and synchronous demodulation.

40 Claims, 2 Drawing Sheets

PULSED HIGH LOSS LOOP BACK SIGNALLING SCHEME

FIELD OF THE INVENTION

The present invention relates to communications systems and in particular to a system and method for monitoring a fibre optic transmission system.

BACKGROUND TO THE INVENTION

In long haul fibre optic communications systems it is important to be able to monitor the transmission properties of the system. Monitoring can be used to locate faults in the fibre or in repeaters or amplifiers. It is also desirable to be able to carry out monitoring whilst the communications system is in service. Various schemes have been proposed.

GB2268017 describes a number of techniques based on the provision of a supervisory signal and a high loss loopback system in which a small proportion of the composite traffic and supervisory signal is looped back at every repeater in the transmission link. The supervisory signal may comprise a pseudo random signal, a reference signal with frequency sweep or a short pulse, and is transmitted using a sub-carrier over a single wavelength traffic signal. Information from the loopback signal is then obtained by detecting correlations, beat frequencies or simple time delays, respectively.

One problem with the techniques described in GB2268017 is the very low signal-to-noise ratio (SNR) associated with the returning signal, wherein the loopback supervisory component must be extracted from the background traffic signal and noise. An associated problem is the slow speed at which information on faults in the transmission system can be collated. For example, in the case of the short pulse supervisory signal, detection relies on a photodiode followed by a simple electrical bandpass filter for discrimination and the filtered signal is simply displayed on an oscilloscope.

U.S. Pat. No. 5,825,515 also discloses a method based on a high loss loopbacK system with a pseudo random supervisory signal. A low bit rate supervisory Pseudo Random Bit Sequence (PRBS) signal, which is Binary Phase Shift Keyed (BPSK) encoded and optically Intensity Modulation (IM) encoded is transmitted using a sub-carrier over a single wavelength traffic signal. A small proportion of the composite traffic and supervisory signal is looped back at every repeater and the supervisory signal is deconvolved from the noise by integration and correlation to yield a supervisory signal level from each repeater. However, using this method in a typical system means an in-service measurement time of the order of 4 hours.

The reason for the long measurement time is again the very low signal to noise ratio of the returned pulses. As a result, long integration times are required to extract the signal with any degree of confidence. Although a data cancellation scheme is employed in the system of U.S. Pat. No. 5,825,515, it is not possible to eliminate much of the noise generated in the PIN diode in the receiver. This problem is addressed U.S. Pat. No. 5,969,833, in which the supervisory signal is transmitted over a separate wavelength. This scheme also reduces the traffic signal penalty due to the supervisory modulation. However, both patents advocate the use of PRBS sequences, which must be de-convolved at the supervisory receiver in order to measure the loop loss to a given repeater. A separate de-convolution process is required for every repeater, which is expensive when many repeaters are present in a system.

The present invention aims to provide a simple, low-cost solution for the in-service monitoring of fibre optic transmission systems, and moreover a solution which delivers the required information in a satisfactory time period.

SUMMARY OF THE INVENTION

According to first aspect of the present invention, an optical transmission system comprises:

a first optical fibre extending between a first terminal and a second terminal for carrying optical signal traffic from the first terminal to the second terminal;

a second optical fibre extending between the first terminal and the second terminal for carrying optical signal traffic from the second terminal to the first terminal; and a plurality of optical repeaters coupled to the first and second optical fibres between the first terminal and the second terminal, each repeater having a permanently connected passive high loss loop back circuit between the first and second fibres;

the first terminal including a transmitter and a receiver, wherein in use, the transmitter launches a pulsed supervisory signal on a dedicated supervisory wavelength on the first optical fibre, and the receiver detects a portion of the supervisory signal looped back from each repeater into the second optical fibre in order to identify the existence and location of faults in the transmission system, and wherein the pulsed supervisory signal is of sufficiently short duration such that portions of the signal returned from each repeater do not overlap with one another.

By employing a pulsed supervisory signal the present invention permits the use of relatively cheap and simple detection circuitry. Moreover, interference with counter-propagating traffic is avoided in the present invention by utilising a dedicated supervisory wavelength, thereby improving the SNR.

In addition, cross-talk between supervisory signals returned from repeaters is avoided by transmitting a pulse that is sufficiently short that when looped back from each repeater there is no overlap. Clearly, the maximum duration of the pulsed supervisory signal is dependent on the spacing of the repeaters in the system, and in particular on the smallest spacing between any two repeaters, and so the transmitter must be tuned to suit the system to which it is coupled.

Preferably, the supervisory wavelength is different to that of any optical signal traffic on the first optical fibre. Preferably, the pulsed supervisory signal is periodically repeated, the period of repetition such that each pulse is returned to the receiver from the furthest repeater before the immediately subsequent pulse is returned from the closest repeater. This is dependent on the time it takes the supervisory signal to be looped back from the furthest repeater.

Preferably, the supervisory signal is modulated to prevent transient effects arising from amplifiers in the transmission system.

In order to measure wavelength dependent losses a plurality of supervisory wavelengths may be used. The supervisory signals may be generated using a single tunable signal source or a plurality of separate signal sources.

A key aspect affecting the cost of the system and the speed of data collection is the architecture of the receiver.

Preferably, the receiver comprises a heterodyne receiver.

Preferably, the heterodyne receiver comprises a local oscillator coupled to a first mixer for mixing the received loopback signal portion with a signal from the local oscillator. Preferably, the heterodyne receiver further comprises a second mixer coupled to both the local oscillator and a transmit oscillator in the transmitter for mixing signals from the two oscillators to provide a reference frequency for synchronous demodulation of the received signal.

It is preferred that the heterodyne receiver comprises an IQ demodulator.

The integration of each return pulse is done sequentially so that a set of parallel detectors is not required. The need for a PRBS signal, a set of parallel correlators at the receiver and a data cancellation unit is also removed. Using the present invention in a typical system, the measurement time is reduced to about 1 minute.

According to a second aspect of the present invention, a method of monitoring the performance of an optical transmission system comprising a first optical fibre extending between a first terminal and a second terminal for carrying optical signal traffic from the first terminal to the second terminal, a second optical fibre extending between the first terminal and the second terminal for carrying optical signal traffic from the second terminal to the first terminal, and at least one optical repeater coupled to the first and second optical fibres between the first terminal and the second terminal, each repeater having a permanently connected passive high loss loop back circuit between the first and second fibres, comprises the steps of:

launching a pulsed supervisory signal on a dedicated supervisory wavelength on the first optical fibre, and detecting a portion of the supervisory signal looped back from each repeater into the second fibre in order to identify the existence and location of faults in the transmission system, wherein the pulsed supervisory signal is of sufficiently short duration such that portions of the signal returned from each repeater do not overlap with one another.

Preferably, the supervisory wavelength is different to that of any optical signal traffic on the first optical fibre. Preferably, the pulsed supervisory signal is periodically repeated, the period of repetition such that each pulse is returned to the receiver from the furthest repeater before the immediately subsequent pulse is returned from the closest repeater. This is dependent on the time it takes the supervisory signal to be looped back from the furthest repeater.

Preferably, the method further includes the step of modulating the supervisory signal, in order to prevent transient effects from amplifiers in the transmission system.

In order to improve the SNR in the received signal, the method preferably includes the further step of optically filtering the loopback signal portion.

Preferably, the method further includes the step of heterodyne reception of the detected loopback signal portion.

Preferably, the method further includes the step of synchronous demodulation of the received signal.

To improve the accuracy of the measured signal still further, it is preferred that the method further comprises the step of averaging the loopback signal portion of a supervisory pulse returned from a repeater. More preferably, the method comprises the step of averaging the loopback signal portions of a plurality of supervisory pulses returned from a repeater.

According to a third aspect of the present invention, an optical transceiver comprises:

means to produce a pulsed supervisory signal on a dedicated supervisory wavelength; and means to detect a portion of the supervisory signal looped back to the transceiver from repeaters in an optical transmission system coupled to the transceiver, in order to identify the existence and location of faults in the transmission system, wherein the pulsed supervisory signal is of sufficiently short duration such that portions of the signal returned from each repeater do not overlap with one another.

Preferably, the supervisory wavelength can be selected to be different to that of any optical signal traffic on the optical transmission system. Preferably, the means to produce the pulsed supervisory signal includes means to periodically repeat the supervisory signal, the period of repetition such that each pulse is returned to the receiver from the furthest repeater before the immediately subsequent pulse is returned from the closest repeater.

Preferably, the transceiver further includes means to modulate the supervisory signal to prevent transient effects from amplifiers in the transmission system.

Preferably, a transmitter section of the transceiver comprises a pulsed laser.

In order to improve the SNR in the received signal, it is preferred that a receiver section of the transceiver comprises a tunable optical filter locked onto the supervisory wavelength.

Preferably, a receiver section of the transceiver comprises a heterodyne receiver. It is preferred that the heterodyne receiver comprises a local oscillator coupled to a first mixer for mixing the received loopback signal portion with a signal from the local oscillator. Preferably, the heterodyne receiver further comprises a second mixer coupled to both the local oscillator and a transmit oscillator in a transmitter of the transceiver for mixing signals from the two oscillators to provide a reference frequency for synchronous demodulation of the received signal.

Preferably, the heterodyne receiver comprises an IQ demodulator.

Thus, the present invention provides a simple cost effective technique for monitoring the performance of components such as repeaters in an optical transmission system. A sequence of short supervisory pulses is launched into the system on a dedicated wavelength and a high-loss loop-back arrangement provides a sample of each supervisory pulse returned from each repeater. Modulation of the pulses mitigates against non-linear effects in system components. Fast collection of high accuracy data with low SNR is obtained by a combination of targeted optical filtering, pulse averaging and heterodyne reception of the loopback signal portions. Simple calibration of the system can be performed during its commissioning with pulses of sufficiently high power for a good SNR.

BRIEF DESCRIPTION OF THE DRAWINGS

Examples of the present invention will now be described in detail with reference to the drawings, in which.

DETAILED DESCRIPTION

Figure 1:
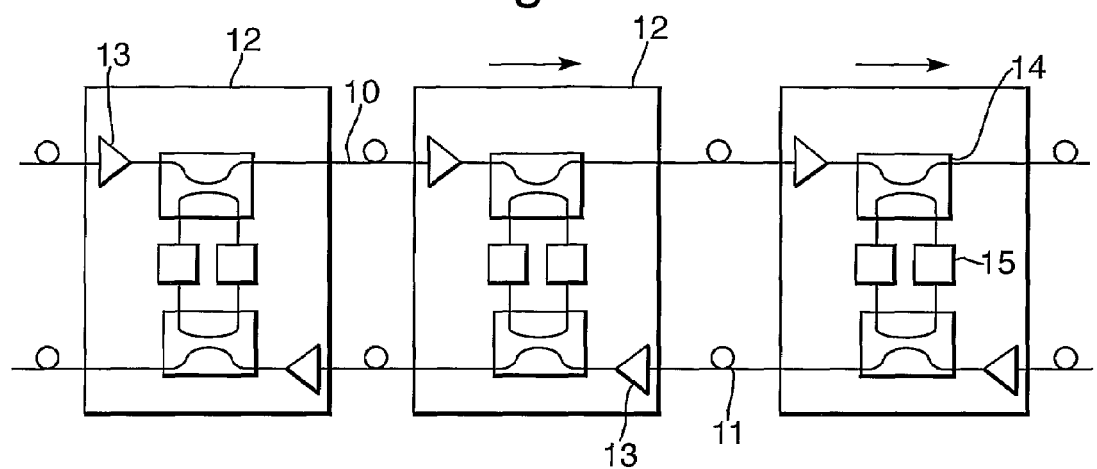
FIG. 1 is a schematic illustration of a section of a repeatered optical fibre link.

FIG. 1 is a schematic illustration of a section of a repeated optical fibre link. Three repeaters are shown in FIG. 1, but a typical long haul fibre link may include many repeaters at predetermined positions along its length in order to amplify optical signals propagating along the link.

The transmission system comprises a first optical fibre 10 which carries optical signals from a first terminal to a second terminal, as indicated by the arrows in FIG. 1. The transmission system also includes the second optical fibre 11 which carries optical signals from the second terminal to the first terminal. As optical signals travel along the optical fibres they become attenuated. Accordingly, repeaters 12 are spaced along the fibres 10 and 11 to amplify the attenuated optical signals. This amplification is accomplished by an amplifier 13 in each repeater. Each repeater has an amplifier for the first fibre 10 and an amplifier for the second fibre 11. Any suitable amplifier may be used but typically the amplifier would be an erbium doped fibre amplifier (EDFA) to compensate for the loss of the transmission fibre.

Each repeater also includes a lossy loopback circuit. The loopback circuit comprises an optical coupler 14, typically a tap coupler, at the output of the amplifier on each fibre. The optical coupler couples a portion of the signal in the fibre to the input of a pad attenuator 15. This portion of the signal which is tapped off is then coupled into the other fibre, i.e. to the return traffic path. The amplifier 13 compensates for the attenuation of not only the fibre itself but also of the coupler on each repeater.

The combined loss of the two tap couplers and the intermediate pad is typically 45 dB. Therefore only a small proportion of the optical signal on one fibre is looped back onto the other fibre from each repeater. It should be noted in this regard that the looped back circuit of FIG. 1 is bidirectional.

The optical signals transmitted from the first terminal will comprise a wavelength division multiplex (WDM) traffic comb over a set of wavelengths. A supervisory wavelength is also included and is coupled into the aggregate traffic signals. It is the supervisory signal which is used to measure losses at each repeater along the link. The supervisory-wavelength can be at either end of the WDM comb or between traffic channels. The supervisory wavelength is chosen to be between two adjacent traffic wavelengths of the counter propagating traffic. In other words, the supervisory wavelength for the first fibre 10 is chosen to lie between two traffic wavelengths of the traffic propagating along fibre 11. No absolute restrictions are placed on the location of the supervisory wavelength with respect to the co-propagating traffic, but performance is improved if it can also be placed between co-propagating traffic wavelengths.

Wavelength dependent loop back losses are measurable by inserting supervisory wavelengths as at a number of points along the WDM comb. If measurement time permits, this can be accomplished using a single tunable laser and a corresponding tunable optical filter at the receiver.

The supervisory signal is generated by a pulsed laser. The pulse duration is chosen to be as long as possible, but sufficiently short so that return signals from each repeater do not overlap. The launched 20 and returned pulses 21 are shown schematically in FIG. 2. As can be seen from FIG. 2 the launched pulse 20 is returned from each repeater so appears multiple times on the return path. The pulse must be short enough that return signals from adjacent repeaters do not overlap. Since the duration of the pulse is greater than the $Er^{3+}$ metastable lifetime τ, the pulse must be modulated to prevent transient effects from saturated EDFA. This can be readily achieved using a sub-carrier of the order of 1 to 2 MHz.

Referring to FIG. 1, if the distance between repeaters i-1 and i is $l_i$, then the total loopback distance $z_i$ for repeater i is $$z_i = 2\sum_{j=1}^{i} l_j, \ i = 1 \ldots n \tag{1}$$

and the path difference $\Delta z_i$ between repeaters i-1 and i is $$\Delta z_i = z_i - z_{i-1} = 2l_i \tag{2}$$

The time required for a signal to return from repeater is $$T_i = \frac{n_r z_i}{c} \tag{3}$$

where $n_r \approx 1.5$ is refractive index of the transmission fibre. The difference in loopback time between adjacent repeaters i-1 and i is then $$\Delta T_i = \frac{n_r \Delta z_i}{c} = \frac{2 n_r l_i}{c} \tag{4}$$

To prevent the overlap of the return signal from adjacent repeaters, the pulse duration must be no greater than $\Delta T_i|_{min}$, i=1 . . . n, where the min subscript refers to the minimum repeater spacing $l_{min}$. To allow for switching time between returned pulses, a guard band should also be provided of duration $T_G$. The pulse duration is then shortened according to:

$$T_p = \frac{2 n_r l_{min}}{c} - T_G \tag{5}$$
$$= \frac{2 n_r l_{min}}{c}(1 - \beta)$$

where $$\beta = \frac{c T_G}{2 n_r l_{min}}$$

is the proportion of $T_p + T_G$ reserved for the guard band.

After a pulse has been launched, a second cannot be transmitted until all the loopback pulses have arrived. From (1) and (3), the time for the leading edge of the pulse to return from the nth repeater is $$T_n = \frac{2 n_r}{c} \sum_{j=1}^{n} l_j \tag{6}$$

where $$\sum_{j=1}^{n} l_j$$

is the length of the system, excluding the last, (n+1)th, span.

Figure 2:
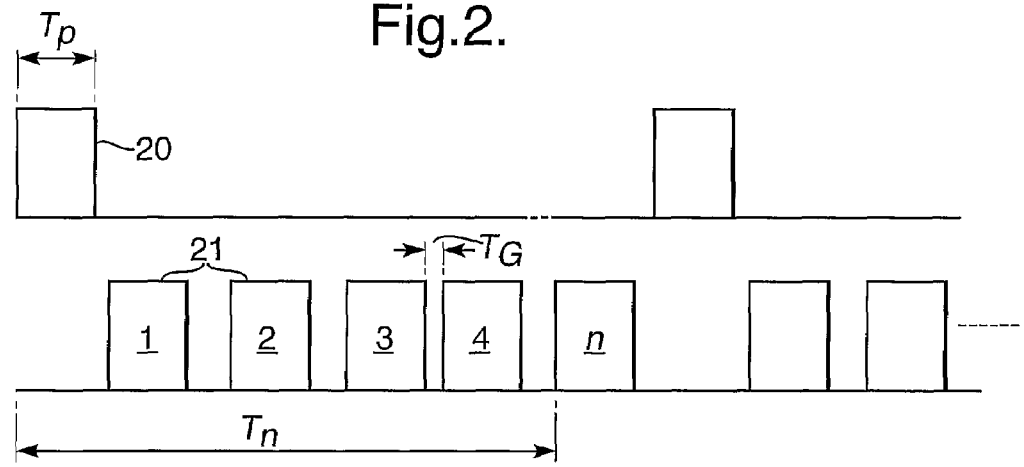
FIG. 2 illustrates the pulse duration requirements for a supervisory signal in accordance with the present invention.

The trailing edge of the pulse arrives after a time $T_n + T_p$ and the pulse repetition time $T_R$, allowing for the guard band, is then $$T_R = T_n + T_p + T_G \qquad (7)$$

$$= \frac{2n_r}{c}\left(l_{min} + \sum_{j=1}^{n} l_j\right)$$

where $T_n + T_p$ is substituted from (5). FIG. 2 illustrates the pulse propagation and return times. The guard band $T_G$ is the time between the closest arriving pulses.

Figure 3:
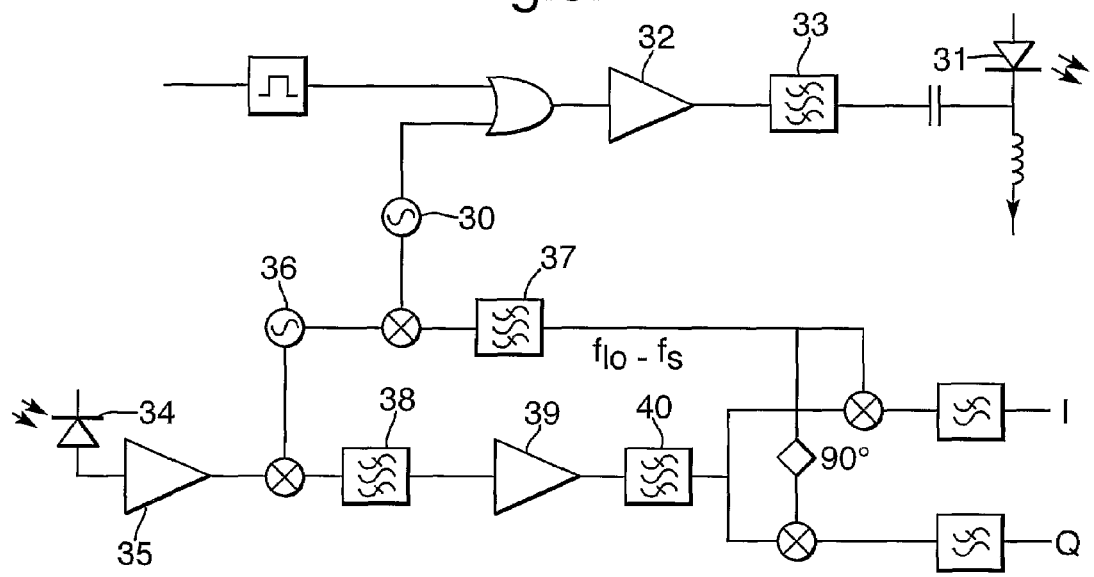
FIG. 3 is a schematic illustration of a transceiver in accordance with the present invention; and, FIG. 4 is a schematic illustration of an optical transmission system in accordance with the present invention.

FIG. 3 illustrates a transceiver architecture in accordance with the present invention. The transceiver provides the supervisory pulsed signals as well as the means to detect the looped back supervisory signals.

The transmitter section operates to produce a stream of supervisory pulses. Gated pulses from oscillator 30 are amplified by amplifier 32 and applied to the bias pin of laser diode 31. The resulting optical pulse from laser diode 31 has burst duration $T_p$, repetition rate $T_r$ and modulation frequency $f_s$. Prior to application to the laser diode 31, the pulses are shaped by pulse shaping network 33 in order to ensure that the pulses are of the desired profile, in this example a square shape.

The receiver section detects and processes the incoming signals to isolate the looped back supervisory wavelength and determine the amplitude of the returned pulses. As it is necessary to ensure that the receiver is tuned to the correct frequency for the returned pulses, the receiver includes a narrowband optical filter (not shown) prior to the optical detector 34, which can be tuned prior to operation of the system to correspond to the wavelength of the received pulses. A dither technique may be used, for example, so that the maximum SNR is obtained.

The receiver shown in FIG. 3 is a heterodyne receiver. The receiver section includes a PIN diode detector 34 followed by an RF amplifier 35. The received signal is then mixed with a signal from a local oscillator 36 generating sum and difference frequencies. The difference frequency is selected by the bandpass filters 38 and amplified by an amplifier 39 and filtered by an intermediate frequency filter 40, as in a conventional superheterodyne receiver. As shown, an IQ-type demodulator is used to extract the loop-back signal at the output of the RF amplifier 35. The reference frequency for the IQ demodulator is obtained by mixing a signal from the local oscillator 36 with a signal from the transmit carrier oscillator 30 and filtering with filter 37, resulting in a DC output at the I and Q ports of the demodulator. The amplitude of the received carrier is then $\sqrt{(I^2+Q^2)}$.

In operation relatively low power pulses must be used for the supervisory signal in order to avoid four wave mixing with data signals. There is also typically a large amount of noise on the returned signals owing to attenuation and amplification of the pulses in the repeaters. This leads to a low signal to noise ratio (SNR), which makes it necessary to average more than one measurement for each repeater in order to ensure a meaningful result. The received signals are detected as a sequence of samples and averaging is performed over a plurality of the samples. The averaging is performed across each pulse and may be repeated for a plurality of pulses from each repeater. Averaging the voltages in this way increases the SNR linearly with the number of samples whereas averaging power would increase the SNR as the square root of the number of samples.

In order to calibrate the system, it is necessary to determine when the returned pulses will be received from each repeater. This can be done using high power pulses during commissioning of the system. The returned high power pulses can be rapidly detected with minimal averaging because the SNR is sufficiently large.

Figure 4:
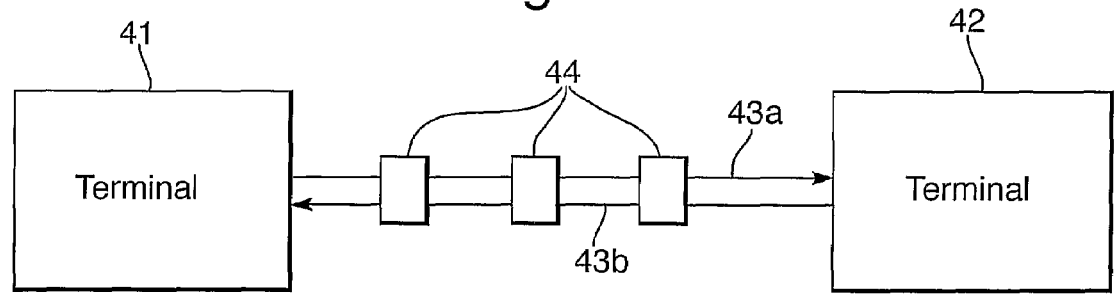

FIG. 4 illustrates an optical transmission system in accordance with the present invention. FIG. 4 shows two terminals 41 and 42 connected by a repeatered optical fibre link 43. The repeaters are indicated by numeral 44. The optical fibre link comprises a first optical fibre 43a, for carrying optical signal traffic from the first terminal 41 to the second terminal 42, and a second optical fibre 43b, for carrying optical signal traffic from the second terminal 42 to the first terminal 41.

The invention claimed is:

1. An optical transmission system comprising:
    a first optical fibre extending between a first terminal and a second terminal for carrying optical signal traffic from the first terminal to the second terminal;
    a second optical fiber extending between the first terminal and the second terminal for carrying optical signal traffic from the second terminal to the first terminal; and
    a plurality of optical repeaters coupled to the first and second optical fibers between the first terminal and the second terminal, each repeater having a permanently connected passive high loss loop back circuit between the first and second fibres;
    the first terminal including a transmitter and a receiver, wherein in use, the transmitter launches a pulsed supervisory signal on a dedicated supervisory wavelength on the first optical fibre, and the receiver detects the portion of the supervisory signal looped back from each repeater into the second optical fibre in order to identify the existence and location of faults in the transmission system, and wherein the pulsed supervisory signal is of sufficiently short duration such that portions of the signal returned from each repeater do not overlap with one another and the supervisory wavelength is different to that of any optical signal traffic on the first and second optical fibres,
    wherein the receiver comprises a heterodyne receiver, the heterodyne receiver comprising a local oscillator coupled to a first mixer for mixing the received loopback signal portion with a signal from the local oscillator and a second mixer coupled to both the local oscillator and a transmit oscillator in the transmitter for mixing signals from the two oscillators to provide a reference frequency for synchronous demodulation of the received signal.

2. An optical transmission system according to claim 1, wherein the pulsed supervisory signal is periodically repeated, the period of repetition such that each pulse is returned to the receiver from the furthest repeater before the immediately subsequent pulse is returned from the closest repeater.

3. An optical transmission system according to claim 2, wherein the supervisory signal is modulated to prevent transient effects from amplifiers in the transmission system.

4. An optical transmission system according to claim 2, wherein, in use, the transmitter launches supervisory signals on a plurality of supervisory wavelengths.

5. An optical transmission system according to claim 1, wherein the supervisory signal is modulated to prevent transient effects from amplifiers in the transmission system.

6. An optical transmission system according to claim 5, wherein, in use, the transmitter launches supervisory signals on a plurality of supervisory wavelengths.

7. An optical transmission system according to claim 1, wherein, in use, the transmitter launches supervisory signals on a plurality of supervisory wavelengths.

8. An optical transmission system according to claim 1, wherein the heterodyne receiver comprises an IQ demodulator.

9. A method of monitoring the performance of an optical transmission system comprising a first optical fibre extending between a first terminal and a second terminal for carrying optical signal traffic from the first terminal to the second terminal, a second optical fibre extending between the first terminal and the second terminal for carrying optical signal traffic from the second terminal to the first terminal, and at least one optical repeater coupled to the first and second optical fibres between the first terminal and the second terminal, each repeater having a permanently connected passive high loss loop back circuit between the first and second fibres, comprising the steps of:
    launching a pulsed supervisory signal on a dedicated supervisory wavelength on the first optical fibre, and
    detecting the portion of the supervisory signal looped back from each repeater into the second fibre in order to identify the existence and location of faults in the transmission system, wherein the pulsed supervisory signal is of sufficiently short duration such that portions of the signal returned from each repeater do not overlap with one another and the supervisory wavelength is different to that of any optical signal traffic on the first and second optical fibres,
    wherein the step of detecting the portion of the supervisory signal further comprises heterodyne reception of the detected loopback signal portion, the heterodyne reception comprising mixing of a signal from a local oscillator with the detected loopback signal portion, the step of detecting further comprising synchronous demodulation of the received signal by mixing using a signal from a transmit oscillator and the signal from the local oscillator to provide a reference frequency for the synchronous demodulation.

10. A method according to claim 9, wherein the pulsed supervisory signal is periodically repeated, the period of repetition such that each pulse is returned to the receiver from the furthest repeater before the immediately subsequent pulse is returned from the closest repeater.

11. A method according to claim 10, further comprising the step of averaging the loopback signal portions of a plurality of supervisory pulses returned from a repeater.

12. A method according to claim 10, further comprising the step of modulating the supervisory signal, in order to prevent transient effects from amplifiers in the transmission system.

13. A method according to claim 10, further comprising the step of optically filtering the loopback signal portion.

14. A method according to claim 10, further comprising the step of averaging the loopback signal portion of a supervisory pulse returned from a repeater.

15. A method according to claim 9, further comprising the step of modulating the supervisory signal, in order to prevent transient effects from amplifiers in the transmission system.

16. A method according to claim 15, further comprising the step of optically filtering the loopback signal portion.

17. A method according to claim 15, further comprising the step of averaging the loopback signal portion of a supervisory pulse returned from a repeater.

18. A method according to claim 15, further comprising the step of averaging the loopback signal portions of a plurality of supervisory pulses returned from a repeater.

19. A method according to claim 9, further comprising the step of optically filtering the loopback signal portion.

20. A method according to claim 19, further comprising the step of averaging the loopback signal portion of a supervisory pulse returned from a repeater.

21. A method according to claim 19, further comprising the step of averaging the loopback signal portions of a plurality of supervisory pulses returned from a repeater.

22. A method according to claim 9, further comprising the step of averaging the loopback signal portion of a supervisory pulse returned from a repeater.

23. A method according to claim 22, further comprising the step of averaging the loopback signal portions of a plurality of supervisory pulses returned from a repeater.

24. An optical transceiver comprising:
    means to produce a pulsed supervisory signal on a dedicated supervisory wavelength; and
    means to detect portion of the supervisory signal looped back to the transceiver from repeaters in an optical transmission system coupled to the transceiver, in order to identify the existence and location of faults in the transmission system,
    wherein the pulsed supervisory signal is of sufficiently short duration such that portions of the signal returned from each repeater do not overlap with one another and the supervisory wavelength is different to that of any optical signal traffic on the optical transmission system,
    wherein a receiver section of the transceiver comprises a heterodyne receiver, the heterodyne receiver comprising a local oscillator coupled to a first mixer for mixing the received loopback signal portion with a signal from the local oscillator and a second mixer coupled to both the local oscillator and a transmit oscillator in the transmitter for mixing signals from the two oscillators to provide a reference frequency for synchronous demodulation of the received signal.

25. A transceiver according to claim 24, wherein the supervisory wavelength can be selected to be different to that of any optical signal traffic on the optical transmission system.

26. A transceiver according to claim 25, wherein the means to produce the pulsed supervisory signal includes means to periodically repeat the supervisory signal, the period of repetition such that each pulse is returned to the receiver from the furthest repeater before the immediately subsequent pulse is returned from the closest repeater.

27. A transceiver according to claim 25, further including means to modulate the supervisory signal to prevent transient effects from amplifiers in the transmission system.

28. A transceiver according to claim 25, wherein a transmitter section of the transceiver comprises a pulsed laser.

29. A transceiver according to claim 25, wherein the receiver section of the transceiver comprises a tunable optical filter locked onto the supervisory wavelength.

30. A transceiver according to claim 24, wherein the means to produce the pulsed supervisory signal includes means to periodically repeat the supervisory signal, the period of repetition such that each pulse is returned to the receiver from the furthest repeater before the immediately subsequent pulse is returned from the closest repeater.

31. A transceiver according to claim 30, further including means to modulate the supervisory signal to prevent transient effects from amplifiers in the transmission system.

32. A transceiver according to claim 30, wherein a transmitter section of the transceiver comprises a pulsed laser.

33. A transceiver according to claim 30, wherein the receiver section of the transceiver comprises a tunable optical filter locked onto the supervisory wavelength.

34. A transceiver according to claim 24, further including means to modulate the supervisory signal to prevent transient effects from amplifiers in the transmission system.

35. A transceiver according to claim 34, wherein a transmitter section of the transceiver comprises a pulsed laser.

36. A transceiver according to claim 34, wherein the receiver section of the transceiver comprises a tunable optical filter locked onto the supervisory wavelength.

37. A transceiver according to claim 24, wherein a transmitter section of the transceiver comprises a pulsed laser.

38. A transceiver according to claim 37, wherein the receiver section of the transceiver comprises a tunable optical filter locked onto the supervisory wavelength.

39. A transceiver according to claim 24, wherein the receiver section of the transceiver comprises a tunable optical filter locked onto the supervisory wavelength.

40. A transceiver according to claim 24, wherein the heterodyne receiver comprises an IQ demodulator.

\* \* \* \* \*

UNITED STATES PATENT AND TRADEMARK OFFICE
CERTIFICATE OF CORRECTION

PATENT NO. : 7,684,711 B2  Page 1 of 1
APPLICATION NO. : 11/568185
DATED : March 23, 2010
INVENTOR(S) : Desbruslais et al.

It is certified that error appears in the above-identified patent and that said Letters Patent is hereby corrected as shown below:

<u>Column 1</u>
Line 39, change "loopbacK" to --loopback--.

<u>Column 3</u>
Line 10, insert --,-- after "unit".

Signed and Sealed this

Nineteenth Day of October, 2010

David J. Kappos
*Director of the United States Patent and Trademark Office*